United States Patent [19]

Crone et al.

[11] 4,145,112

[45] Mar. 20, 1979

[54] LOW-PROFILE RAISED RETROREFLECTIVE SHEETING

[75] Inventors: Richard L. Crone, Woodbury; Robert L. Elton, White Bear Lake, both of Minn.

[73] Assignee: Minnesota Mining and Manufacturing Company, Saint Paul, Minn.

[21] Appl. No.: 815,568

[22] Filed: Jul. 14, 1977

[51] Int. Cl.$^2$ ............................................. G02B 5/124
[52] U.S. Cl. ........................................ 350/103; 404/14
[58] Field of Search ........... 350/6, 109, , 107, 97–106; 404/10–14; 116/63 P

[56] References Cited

U.S. PATENT DOCUMENTS

| | | | |
|---|---|---|---|
| 2,310,790 | 2/1943 | Jungersen | 350/109 |
| 2,991,698 | 7/1961 | Leubaz | 350/105 |
| 3,587,415 | 6/1971 | Eigenmann | 350/105 |
| 3,671,101 | 7/1969 | Finch | 350/109 |
| 3,836,226 | 9/1974 | Cechetini | 350/105 |
| 3,879,148 | 4/1975 | Eigenmann | 404/14 |
| 4,025,159 | 5/1977 | McGrath | 350/105 |

Primary Examiner—John K. Corbin
Assistant Examiner—B. W. de los Reyes
Attorney, Agent, or Firm—Cruzan Alexander; Donald M. Sell; Roger R. Tamte

[57] ABSTRACT

Low-profile raised retroreflective sheeting useful for retroreflecting light that strikes the sheeting at a high incidence angle comprises a base retroreflective layer and a light-directing layer disposed above the base retroreflective layer. The light-directing layer comprises a longitudinally-extending series of short transparent projections which each have upwardly extending front and back edge surfaces. The front edge surface is disposed across the path of high-incidence-angle light so as to transmit a high percentage of such light rays; and the back edge surface is disposed so as to reflect the light transmitted through the front edge surface to the retroreflective layer for retroreflection by the layer and to return light retroreflected by the retroreflection elements back through the front edge surface toward its source.

27 Claims, 12 Drawing Figures

LOW-PROFILE RAISED RETROREFLECTIVE SHEETING

BACKGROUND OF THE INVENTION

Major efforts have been underway for some time to improve pavement markings that guide traffic on roadways. Some of the most important and challenging objectives of these efforts are:

(1) Brighter visibility by the markings at night, generally through improved retroreflection of light rays from the headlights of vehicles approaching the markings. The most common retroreflective pavement markings are painted lines in which glass microspheres are partially embedded; retroreflection from such markings is at a low level because of the absence of a specularly reflective material underlying the microspheres, because of abrasion and removal of microspheres by traffic wear, and because retroreflective markings reflect at lowest intensity light rays that strike them at a high "incidence" angle ("incidence" angle is defined as the angle between the light rays and a line perpendicular to the plane of the retroreflective marking; light from a vehicle spaced 10 meters to 200 meters from a retroreflective coating on a roadway strikes the plane of the roadway at incidence angles of 86° to over 89°.)

(2) Maintenance of visibility of the markings during precipitation. Even a thin film of water covering the surfaces of glass microspheres protruding from a painted line will prevent the microspheres from reflecting incident light; and yet lane delineation is most critically needed during periods of precipitation, when visibility is reduced and normal landmarks are hidden or less distinct.

(3) Truer and more intense colors of retroreflective markings when viewed with retroreflected light at night; in a glass-beaded painted line, the color of retroreflected light is produced by diffuse reflection from the pigmented paint binder underlying the glass beads, and this diffuse reflection leaves a washed-out color.

(4) Resistance to wearing away of the markings by traffic.

(5) Utility on roadways that are plowed to remove snow.

One commercial attempt to meet at least some of these objectives is the so-called raised pavement marker, which has been used in predominantly snow-free regions. Most commonly, these pavement markers comprise rather rigid blocks one to three centimeters high, ranging in shape from a trapezoid in side view to a smoothly rounded disc, and supporting an upwardly extending retroreflective panel or bar at the front of the marker. While these markers are generally effective during precipitation, their use in regions of snowplowing is severely limited (even though some attempts have been made at great expense to house the markers in protective metal casings). Other limitations on their use are the expense to manufacture and install them. And if a rigid marker of this type is removed from a roadway, as by traffic or snowplowing, it becomes a hazardous object capable of being hurled into the path of a moving vehicle.

In an even more elaborate prior-art approach, multipart pavement markers several centimeters deep are partially embedded in a roadway; often a top part that is visible to traffic and carries a retroreflector is depressible by traffic into a recess in a lower part that is embedded in the roadway. These approaches are too expensive for widespread use and they have yet to be proved effective for extended use in multiseason climates.

A different approach, representing the results of an effort funded by the United States Department of Transportation (described in Report No. FHWA-RD-73-78 by Battelle Columbus Laboratories, Government Accession No. PB-224 934), involves the embedding of a series of thin molded plastic plates in a roadway so that their upper surface is approximately flush with the roadway surfaces. The plates have a flat upper surface and an array of cube-corner retroreflective units on their bottom surface, which are inclined toward traffic that approaches the marker on a roadway. Insofar as known, the markers described in the report have not come into commercial use. Some major problems with the markers are that, even with the cube-corners inclined, the markers will only retroreflect light striking them at comparatively low incidence angles, corresponding to a location of a vehicle only 10-15 meters from the marker; light tends to glance off the flat upper surface of the plates; and abrasion of the flat upper surface of the markers quickly reduces reflective properties at least when the markers are dry.

Another approach in the prior art is a variety of preformed tapes. Some of these tapes are more durable and longlasting than painted lines, but make no effort to provide wet-reflecting capability. Others are intended to also provide wet-reflecting ability, as by adding at spaced intervals on the top of the tape strips that are covered or filled with glass beads (see Rideout, U.S. Pat. No. 3,418,896; Eigenman, U.S. Pat. No. 3,587,415; and Finch, U.S. Pat. No. 3,836,275); or by configuring the tape with transparent low-height wedges in which retroreflective sheet material is contained (see Wyckoff, U.S. Pat. No. 3,920,346). However, manufacture of such constructions is complicated and none of them has demonstrated a capability for extended use and satisfaction of the objectives listed above.

SUMMARY OF THE INVENTION

The present invention provides a new retroreflective sheeting having a unique structure for receiving and reflecting high-incidence-angle light, and which has demonstrated promise for meeting the objectives outlined above. Briefly, this new sheeting comprises a base retroreflective layer extending in the plane of the tape and comprising retroreflective elements adapted to retroreflect light impinging on top of the layer within a predetermined angular range; and a light-directing layer disposed above the layer of retroreflective elements. The light-directing layer comprises a longitudinally-extending series of short transparent projections which have front and back upwardly extending edge surfaces. The front edge surface is disposed across the path of high-incidence angle light, whereby it transmits rather than reflects away, a high percentage of such light that impinges on the surface; and the back edge surface is disposed to both reflect light transmitted by the front edge surface to a path within said predetermined angular range for retroreflection by the retroreflective elements, and to return light reflected by the retroreflective elements back through the front edge surface toward its source, e.g. an oncoming vehicle.

As the above summary indicates, sheeting of the invention provides a type of raised retroreflective marking but the raised material is distributed as a series of shallow-height projections, which redirect light to an underlying retroreflective sheet material that extends along the length of the sheeting. This structure offers a number of important advantages: the sheeting may be conveniently applied as a tape onto extensive lengths of a roadway; the series of light-directing projections combine to cumulatively direct a high percentage of light from the headlights of an oncoming vehicle to the retroreflective elements; the retroreflective layer is protected against direct traffic contact; and the shallow projections offer wet reflection while minimizing engagement with a snowplow. Moreover, the components of the structure are continuous sheet goods, requiring no cutting or special fabrication, for example, of a retroreflective component.

The latter feature is of special advantage since it means that cube-corner retroreflective sheet material, which normally is adapted to receive and reflect light only in a narrow range of low incidence angles, can be included in a pavement marking tape in continuous sheet goods form. Use of cube-corner retroreflective sheet material in sheeting of the invention is greatly preferred, because of the bright retroreflection provided by such material. Cube-corner retroreflective sheet material joined to a light-directing layer as described above, provides an especially bright retroreflectivity—brighter, insofar as known, than has ever before been provided by a pavement marking tape.

PRIOR ART STATEMENT

A number of prior-art pavement-marking products include structure for redirecting high-incidence-angle light rays to a retroreflective structure. One such product taught in Rowland, U.S. Pat. No. 3,924,958, is a multi-part pavement marker comprising a housing adapted to be set in a roadway and a resiliently depressible cap attached to the housing. A retroreflective sheet is contained in the housing, and a light-redirecting means in the cap directs light rays from an approaching vehicle to the retroreflective sheet. The light-redirecting means comprises a transparent block having one or more surfaces that face oncoming traffic, and one or more prisms in back of the surfaces to reflect light entering the surfaces downwardly to the retroreflective sheet.

A similar structure taught in Becker, U.S. Pat. No. 2,328,407 comprises a large glass disc which is partially embedded in a roadway but which supports a triangular prism above the roadway surface. One face of the prism is directed toward oncoming traffic and the prism is intended to reflect light from the traffic to a reflector disposed beneath the bottom face of the prism.

Other prior-art pavement markers redirect light rays through refraction instead of internal reflection. For example, there are several raised pavement markers in which a panel of cube-corner retroreflective elements is covered at an inclined front surface of the marker by a layer of transparent resin, and light rays that enter the layer of resin are refracted to the retroreflective elements; see, for example, Heenan, U.S. Pat. No. 3,332,327; Cechetini, U.S. Pat. No. 3,836,226; Arnott et al, U.S. Pat. No. 3,954,324; Heasley et al, U.S. Pat. No. 3,980,393; and Japanese Patent Publication No. 46-40668.

Another variation taught in Leubaz, U.S. Pat. No. 2,991,698, is a pavement marker that comprises a block of glass designed to be embedded in a roadway and having a convex upper surface and a set of reflecting faces formed on the bottom of the block. Light is refracted at the convex upper surface to the reflecting faces on the bottom of the block.

None of the described rigid or multi-part prior-art devices in any way suggests a sheeting-type product, which is adapted to be applied onto an extensive portion of the surface of a roadway, and which comprises a plurality of shallow-height light-directing projections disposed one after the other along the length of sheeting so as to cumulatively receive a large amount of light from an oncoming vehicle. As previously discussed, a sheeting-type product opens the way to a number of important advantages in the pavement marking field, particularly capability to inexpensively incorporate continuous brightly retroreflective sheet material; susceptibility to rapid and economic application to a roadway; continuous lineally extending markings; and utility in regions that experience snow. The massive light-redirecting products of the prior art, embedded or depressible into a roadway, do not lead to a sheeting product with such advantages.

Redirection of light rays to a retroreflective surface has also been taught in screen-type products useful in projecting images. Such a product is taught in Altman, U.S. Pat. No. 3,614,199 (see especially FIG. 6) and comprises a sheet having a multiplicity of refracting lenses on a first sheet adhered to a second sheet having a set of retroreflective cube-corner elements. When light is beamed at an image-bearing transparency laid over this assembly, the light is returned by the retroreflective sheet and can be projected onto a screen.

As may be seen, this structure is not intended or adapted to use as a pavement marking (e.g. it is not designed to receive high-incidence-angle light rays); and does not suggest retroreflective sheeting of the invention.

DESCRIPTION OF THE DRAWINGS

FIGS. 3 A and B are plan views of representatives cube-corner retroreflective elements useful in sheeting of the invention;

DETAILED DESCRIPTION

Figure 1:
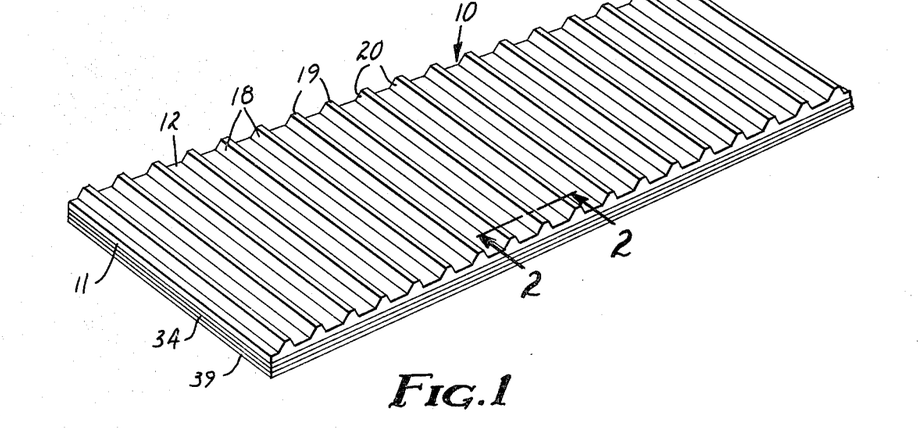
FIG. 1 is a perspective view of a segment of reflective sheeting or tape of the invention in place on a paved surface.
Figures 2, 5, 6:
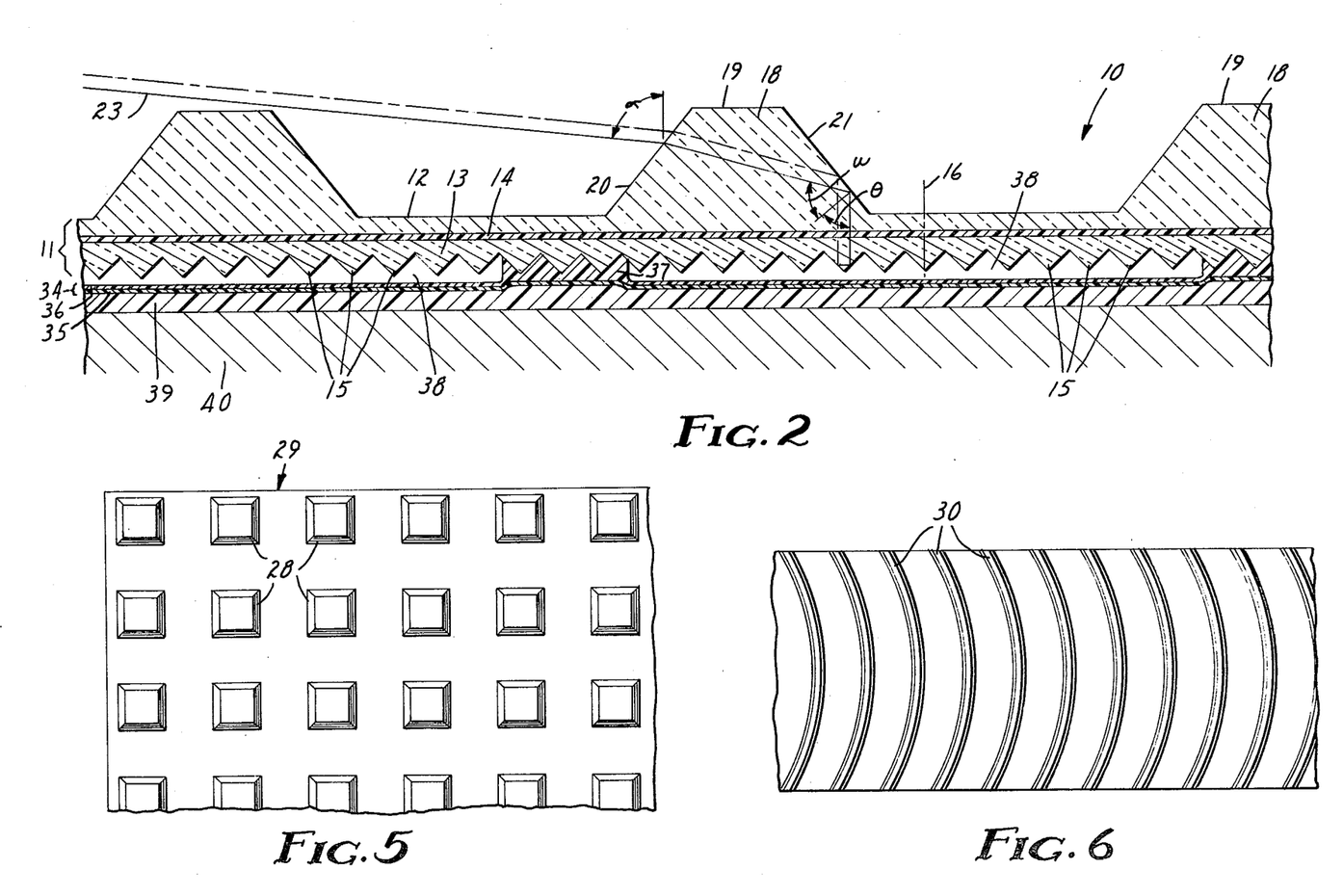
FIG. 2 is a sectional view through the sheeting shown in FIG. 1 along the lines 2—2.
FIGS. 4–6 are plan views of different illustrative sheetings of the invention.

A first component of the sheeting of the invention 10 shown in FIGS. 1 and 2 is a configured sheet 11, which in this illustrative case comprises a top sheet or layer 12 and a bottom sheet or layer 13 adhered together with a layer of adhesive 14. The sheet 11 could also be formed by configuring the top and bottom surfaces of a single integral sheet (the term "sheet material" is used herein to describe both separate sheets and strata of a single integral sheet). The bottom sheet 13 is configured on one face with a monolayer of cube-corner retroreflective elements 15. Cube-corner elements can be usefully arranged in several different patterns, two of which are shown in plan view in FIGS. 3A and 3B. In the illustrated sheeting 10 the axis 16 of the cube-corner elements 15 is perpendicular to the plane of the sheet 13, but the axes of the cube-corner elements can also be usefully skewed from the perpendicular. Sheets configured with cube-corner elements are taught in such prior-art literature as Jungersen, U.S. Pat. No. 2,380,447; Rowland, U.S. Pat. No. 3,684,348; and Stamm, U.S. Pat. No. 3,712,706.

The top sheet 12 of the sheet 11 is formed with a series of transversely extending projections or ribs 18 spaced along the longitudinal length of the sheeting. The illustrated projections 18 are trapezoidal in cross section, having a flat top surface 19 and inclined front and back upwardly extending edge surfaces, 20 and 21 (for convenience in this specification the edge surface that faces light to be reflected, e.g., traffic in a one-way lane of travel, is called the front edge surface). The front and back edge surfaces 20 and 21 are inclined at the same angle, which is desirable to allow the sheeting or tape to retroreflect light directed at it from either direction along its length. Light rays 23 from an oncoming vehicle striking the sheeting at a high incidence angle alpha ($\alpha$) are received through the front edge surface 20.

Thereupon the light rays 23 are refracted and travel to the back edge surface 21. Since the angle at which the light rays 23 strike the back edge surface 21 is greater than the critical angle for the surface (i.e. the angle of a light ray that would be bent upon leaving the surface to a path exactly coinciding with the surface), the light rays 23 are internally reflected from the surface 21. This reflection is specular reflection, as from a mirror, with the angle of reflection (i.e. the angle theta ($\theta$) between the reflected light ray and a line perpendicular to the surface 21) being equal to the angle of incidence (the angle omega ($\omega$)) of the ray. The inclination of the back edge surface 21 is chosen so that the bulk of high-incidence-angle light rays 23 transmitted by the front edge surface 20 are reflected to a path that will result in retroreflection of the light rays 23 at a high intensity by the cube-corner retroreflective elements 15. In general, cube-corner elements of conventional plastic materials (having a refractive index of about 1.50) will retroreflect at high intensity light rays that form an angle of approximately 15° or less with the axis of the cube-corner elements, though they will also retroreflect at lesser amounts light incident outside such an angle.

After retroreflection by the cube-corner elements, the light rays 23 travel back along substantially the same path that they traveled to the cube-corner elements, being reflected by the back edge surface 21 and then passing through the front edge surface 20 to the oncoming vehicle. Some spreading of the reflected light from the original path of incidence occurs, such that a portion of the reflected light from the headlight of an oncoming vehicle will reach the eyes of a driver of the vehicle. To measure the amount of light that will reach the eyes of the driver, retroreflected light is commonly measured at an observation angle 0.2° away from the axis on which the light traveled to the reflector.

The light-directing projections in sheeting of the invention may take a variety of shapes besides that illustrated in FIGS. 1 and 2. For example, although a flat top surface for the projections is desirable because of its durability, other configurations — including pointed surfaces such that the projection is like a saw tooth — are useful. The inclination of the edge surfaces can be varied, although for material of a particular index of refraction, certain angles achieve best results, i.e. permit a high percentage (preferably at least 75%) of light striking the front edge surface to be transmitted through the front edge surface, and refract and reflect the transmitted light to the most desired path. For trapezoidal projections made from material having an index of refraction of about 1.5 and having equal angles between the front and back edge surfaces and the plane of the sheeting, the angles preferably are between about 45° and 60° and most preferably are about 53°. However, the inclination of the edge surfaces can vary outside this range and in fact a projection having a perpendicular front edge surface can be successfully used.

Figure 4:
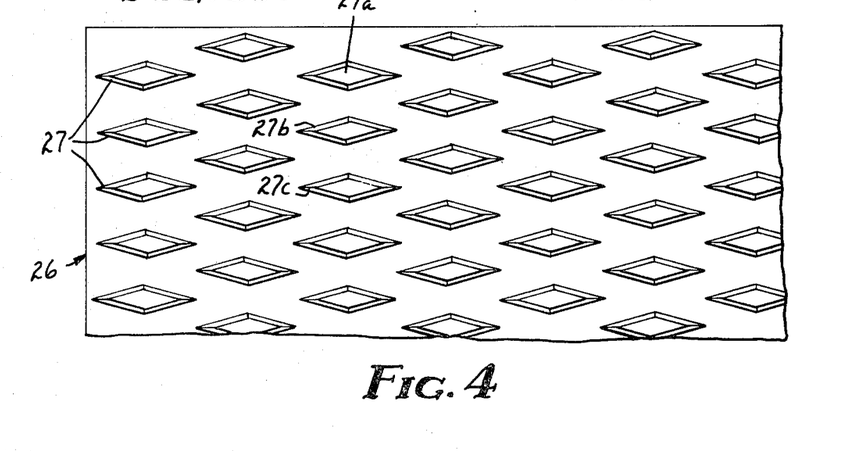

Illustrative variations in plan view configuration are shown in FIGS. 4–6. FIG. 4 is a plan view of sheeting 26 having a diamond-shaped projections 27, useful, for example, for lane markings where light impinges at large "horizon" angles (i.e. the angle between incident light rays and a plane perpendicular to, and extending along the longitudinal axis of, the sheeting; in FIG. 4 the longitudinal axis is from top to bottom). The rib-like projections shown in FIGS. 1 and 2 have a surprisingly wide range of horizontal reflectivity, e.g. 30°, or more, on either side of the longitudinally extending plane, which is adequate for much lane delineation; but a diamond shaped, especially in the transversely elongated form of FIG. 4, is useful to provide a wider range of horizontal reflectivity.

The square projections 28 shown in FIG. 5, or other rectangular projections in which length along the axis of the sheeting is substantial, i.e. at least 50 percent, with respect to transverse length, are useful for markings where traffic on a roadway travels at cross directions, as at an intersection. The curved projections 30 shown in FIG. 6 have increased horizontal reflectivity.

Figure 7:
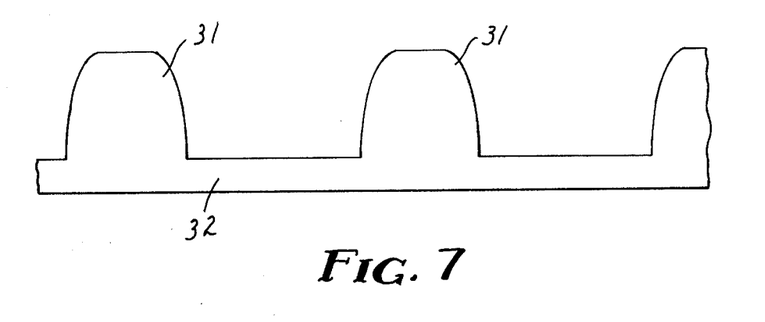
FIG. 7 is an edge view through a top film of a different illustrative sheeting of the invention.

Projections may also be curved in the manner of the projections 31 of the top sheet 32 shown in FIG. 7. However, the transmitting and reflecting edge surfaces of the projection are desirably planar so as to maintain the most desired angles of incidence with light rays being directed by the projections.

The shorter the projections the more sheet-like is sheeting of the inventions and the more snowplow resistant. Generally, the projections are no more than about 5 millimeters in height, (the height of the projections is the distance the projections extend above surrounding sheet material) and for most embodiments of flexible sheeting (i.e. capable of being wound into a storage roll), the projections have a height of no more than about 3 millimeters. Projections having a height of one millimeter and less will provide useful wet reflection, and such projections are preferred for pavement markings.

The longitudinal spacing between the projections should be chosen in conjunction with their height. A desired density for the projections can be described in terms of a ratio of the spacing between projections (the distance between the bottoms of the back and front edge surfaces of two adjacent projections) and the height of the projections. The following table shows the number of projections of the type shown in FIGS. 1 and 2 that would be included per meter length of sheeting for different useful "R" ratios (calculations were based on the assumption that the relation between dimensions of a projection are maintained for the different height projections; the "R" ratio for a matrix of projections as shown in FIG. 4 is based on a series of projections located on a common axis, i.e. the projections 27a, 27b, 27c, etc.)

| Height of Projection (millimeter) | Number of Projections per Meter Length of Sheeting for Different Values of "R" Ratio | | | | |
|---|---|---|---|---|---|
| | R = 0.5 | R = 1 | R = 5 | R = 10 | R = 50 |
| 0.25 | 1600 | 1330 | 570 | 333 | 80 |
| 0.50 | 800 | 665 | 285 | 176 | 39 |
| 0.75 | 534 | 445 | 180 | 111 | 25 |
| 1.00 | 400 | 333 | 142 | 83 | 19 |
| 1.50 | 267 | 222 | 95 | 56 | 13 |
| 2.00 | 200 | 168 | 71 | 42 | 10 |
| 3.00 | 134 | 110 | 48 | 28 | 6 |
| 4.00 | 100 | 83 | 35 | 21 | 5 |

The projections should generally be present in an amount such that the stated ratio is no more than 50 to 1, and preferably no more than 5 to 1; preferably the ratio is at least 0.5 to 1, although as shown below, "R" ratios of zero are also useful.

Figure 8:
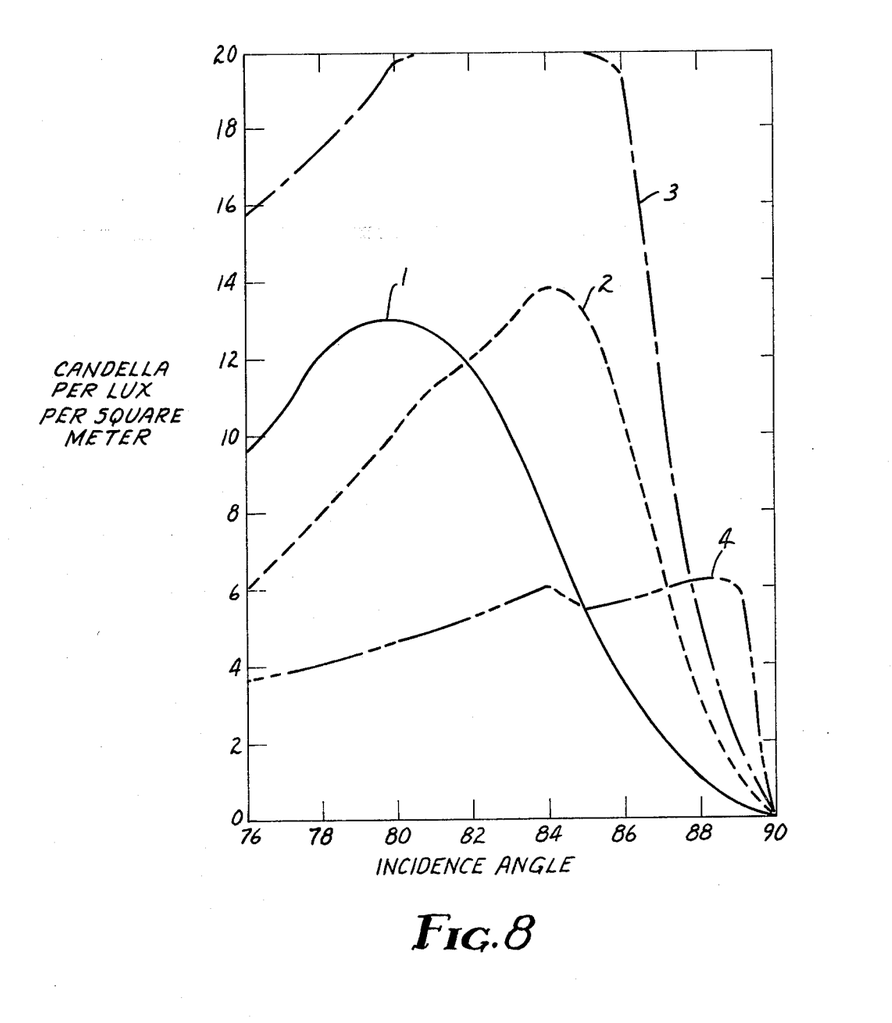
FIG. 8 is a graph showing the light reflected by different illustrative sheetings of the invention versus the angle of incidence of the light rays.
Figure 9:
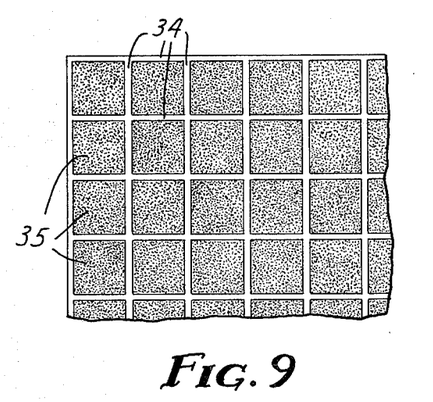
FIG. 9 is a bottom view of the sheeting shown in FIGS. 1 and 2.

FIG. 8 is a graph of reflected light versus angle of incidence for a set of sheetings of the type shown in FIGS. 1 and 2 having different longitudinal spacings between the projections, with projections being 0.76 millimeters high, and having a pitch of 53° on the first and second edge surfaces. The reflection is given in candella of reflected light per lux of incident light per square meter of sheeting. Curve 1 shows the reflection for sheeting in which there is no spacing between the projections ("R" ratio of zero); curve 2 is for a spacing of 1.78 millimeter; curve 3 is for a spacing of 3.56 millimeters; and curve 4 is for a spacing of 23.6 millimeters.

As a point of comparison in evaluating the curves, it may be noted that typical glass-beaded painted lines generally provide no more than 0.2 candella of reflected light per lux per square meter. All the spacings depicted in FIG. 8 are more useful than glass-beaded painted lines over wide ranges of useful angles. Fluctuations in road surfaces mean that light rays from a vehicle will strike some portions of a lineally extending pavement marking at lower incidence angles, e.g. 75° or less; and sheeting of the invention is of advantage in the wide range of angles that it will accept.

For the sheeting of curve 1 in which there is no spacing between projections, diffraction effects are believed to reduce the reflection at high incidence angles. To provide a desired improvement over conventional glass-beaded markings at common high incidence angles using the 0.75 millimeter-high projections depicted in FIG. 8, there should be at least about one millimeter spacing between ribs (corresponding to an "R" ratio of slightly more than 1), and preferably at least about 3 millimeters spacing ("R" ratio of 4).

The curves also show that a spacing of at least 20 millimeters provides bright retroreflection at very high incidence angles, which is a useful property. Large spacings also increase the portion of a projection that is exposed to incident light, and thereby minimize the effect of wear on the tip; but closer spacing improves protection against full tire contact such as conventional raised pavement markings often experience. The zero, one-millimeter, three-millimeter, and twenty-millimeter spacings noted above for 0.75 millimeter-high projections correspond to approximately 50-micrometer, 70-micrometer, 170-micrometer, and 890-micrometer-high bands of exposure of the front edge surface of the rib, respectively, for light incident at an angle of 88°.

Although the sheeting 10 illustrated in FIGS. 1 and 2 relies on internal reflection of light by the back edge surface 21, reflection can also be caused by coating the back edge surface with a specularly reflective material. Such coatings, e.g. of vapor-deposited metal, are preferably covered with a polymeric coating to protect them against weathering and traffic wear. Specular coatings on the back edge surface also are useful to cause the sheeting to reflect only light that is incident on the tape from a particular direction.

The illustrative sheeting of the invention 10 shown in FIGS. 1 and 2 includes a cover sheet 34 spaced from the cube-corner elements 15 to protect the elements against moisture or other contamination that would reduce their reflective properties. Cube-corner retroreflective elements can be coated with specular material, e.g. to permit adhesive or some other material to be applied directly to the coated cube-corner surface. However, retroreflection is generally superior when the exterior surfaces of the cube-corner elements are uncoated and have an air interface.

Useful techniques for attaching a cover sheet to a cube-corner surface are taught in Elton, British Pat. No. 1,476,447; McKenzie, U.S. Pat. No. 3,190,178 and McGrath, U.S. Pat. No. 4,025,159, all of which are incorporated herein by reference. The cover sheet 34 shown in FIG. 2, comprises two layers — a support sheet 35 and a layer 36 of thermoformable material carried on the support sheet and formed with a pattern of raised areas 37. When the cover sheet 34 is laid against the cube-corner surface of the configured sheet 11, and the assembly of sheets pressed between a pair of heated platens, the bonds 37 deform at their point of contact with the cube-corner surface. Alternatively, the layer 36 is a constant-thickness coating, and one of the platens has a pattern of raised ridges; pressure between the platens deforms the layer 36 into bonds 37 that contact the cube-corner surface. When sufficient heat and pressure are used, the cube-corner elements may deform in the areas pressed upon.

As shown from the bottom of the illustrative sheeting 10 in FIG. 7, preferably there is a connected network of narrow bonds 37 which form a plurality of hermetically sealed cells 38. Following the embossing operation, the cover or sheet continues to be in spaced relation with the cube-corner surface. Very little spacing, as thin as a monomolecular layer of air, for example, provides the necessary air interface to obtain desired optical effects.

As taught in McGrath, U.S. Pat. No. 4,025,159, the thermoformable material of the layer 36 can be cured, preferably by radiation, to a relatively infusible and insoluble condition after thermoforming. Electron-beam radiation is especially desired for the curing operation because of its speed and efficient use of applied energy and its ease of control.

As also taught in McGrath, a layer of glass microspheres can be embedded in the surface of the thermoformable layer 36 as as to underlie the cube-corner elements (see also Weber, U.S. Pat. No. 3,140,340). Such a layer of glass microspheres can improve total retroreflection by retroreflecting any light that travels through, rather than being retroreflected by, the cube-corner elements. In other sheeting of the invention, glass microspheres are included as the only retroreflective elements; i.e. a sheet corresponding to the cover sheet carries a layer of microspheres, but the configured sheet (corresponding to the sheet 11 in FIG. 2) has a flat bottom surface without cube-corner configurations.

The cover sheet 34 in the illustrative sheeting 10 carries a layer of adhesive 39 by which the tape can be adhered to a roadway 40. The adhesive should be a material that is normally tacky at the time of application of the tape to the roadway. Pressure-sensitive adhesives are especially desirable. However, the adhesive can also be a heat-activatable adhesive, and it can be curable material. In addition, rather than sheeting of the invention carrying adhesive, adhesive may be directly coated on the paved surface.

The configured sheets in sheeting of the invention may be made from a variety of materials including thermoplastics such as acrylic polymers (polymethylmethacrylate-based sheets are presently preferred, e.g. for weatherability), polycarbonates, polyurethanes, polyamides, polyesters, and polyvinylchlorides; and crosslinking materials such as acrylic polymers and flexibilized epoxy-resin-based compositions. The configured sheets can best be formed by casting or extruding molten material onto a configured mold surface and hardening the cast or extruded material, but they can also be formed by pressing preformed flat films against a mold surface.

The configured sheets in sheeting of the invention and any adhesive used to adhere them together should have a high degree of transparency, but they also may be colored with transparent dyes or pigments to give the sheeting a true and intense color, either in daylight or retroreflected light. Use of color in one of the configured sheets is generally a preferred way to color the sheeting.

The invention will be further illustrated by the following examples.

EXAMPLE 1

Figure 3A:
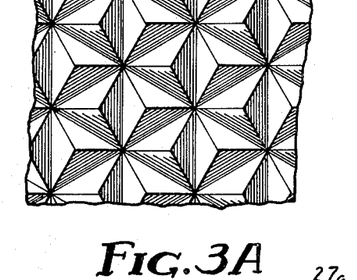
Figure 3B:
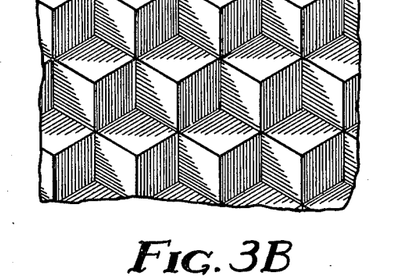

Separate films of impact-modified polymethylmethacrylate were pressed in a platen to form top and base sheets as shown in FIG. 1. The top sheet had a thickness of 0.125 millimeter in the web portion between the projections, and the projections had a height of 0.75 millimeter. The top surface of each projection was 0.65 millimeter in the longitudinal direction of the sheeting and the first and second edge surfaces were disposed at an angle of 53° to the plane of the top sheet. The projections were centered on lines longitudinally spaced 3.56 millimeters apart along the length of the sheeting. The base sheet was formed with cube-corner elements having a height of 140 micrometers and a pattern as shown in FIG. 3A. The nonconfigured surfaces of the top and base sheets were joined together by a thin layer of adhesive that was solvent-coated on a silicone-coated paper release carrier, dried to a thickness of 25 micrometers, and then pressed against the top sheet. The carrier was removed and the exposed adhesive surface pressed against the base sheet. A cover sheet comprising a 15-micrometer-thick film of polyethylene terephthalate carrying a 5-micrometer-thick thermoformable layer of a copolymer of ethylene terephthalate and isoterephthalate was thermoformed in a network pattern to attach the cover sheet to the cube-corner surface. A 125-micrometer-thick layer of butyl-rubber-based rubber-resin pressure-sensitive adhesive which had been previously coated onto a release liner was then adhered to the exposed surface of the cover sheet, and the release liner left in place as a protective liner for the adhesive. In laboratory tests the resulting sheeting had a very bright initial reflection and maintained a useful level of reflection over an extensive period of simulated traffic.

EXAMPLE 2

Figure 10:
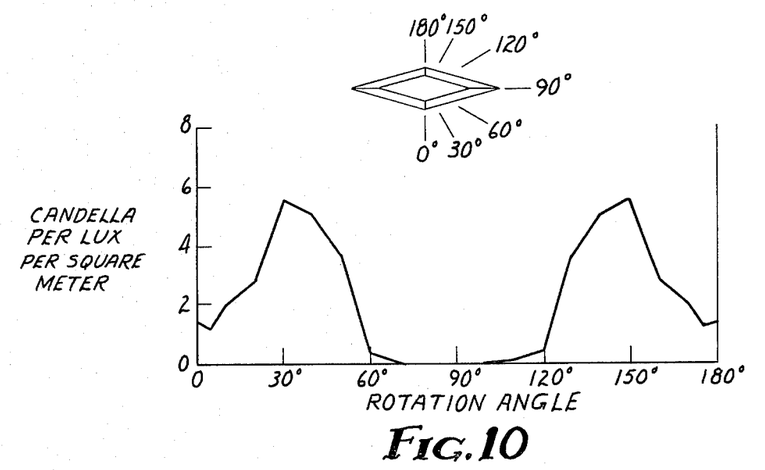
FIGS. 10 and 11 are graphs showing the light reflected by sheetings pictured in FIGS. 4 and 5, respectively, at different horizontal angles of incidence.

A top sheet as shown in FIG. 4 was made by cutting two sets of crossing grooves (at angles of 30° to one another) in a 1.5-millimeter-thick sheet of polymethylmethacrylate. The grooves were 0.75 millimeter deep, were 1.9 millimeter wide and spaced 1.70 millimeter at their base, and formed face angles of 53° on the projections left between the grooves. An approximately 10-centimeter-by-10-centimeter section of the resulting top sheet was laid on the flat top surface of a cube-corner sheet as described in Example 1, and the reflectance of the composite measured at various horizon angles using light have a vertical incidence angle of 86° and an observation angle of 0.2°. Results are shown in FIG. 10 in candella per lux per square meter.

EXAMPLE 3

Figure 11:
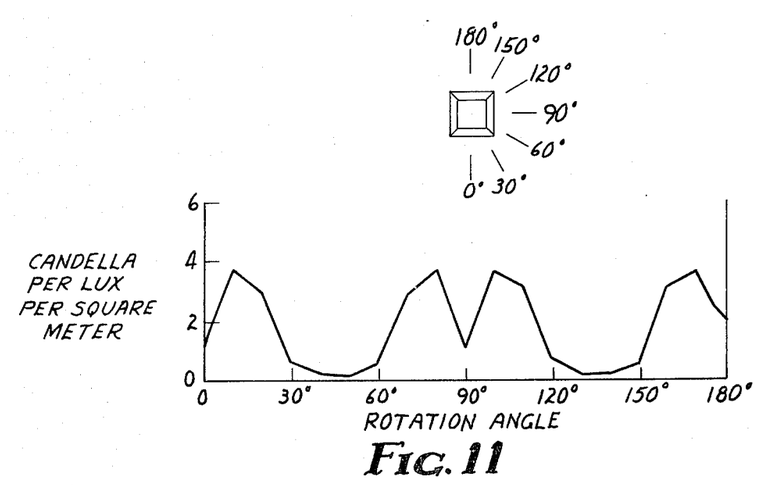

A top sheet as shown in FIG. 5 was made by cutting two sets of grooves (perpendicular to one another) in a 1.5-millimeter-thick sheet of polymethylmethacrylate. The grooves were 0.75 millimeter deep; were 1.78 millimeter wide and spaced 1.78 millimeter at their base; and formed face angles of 53° on the projections left between the grooves. An approximately 10-centimeter-by-10-centimeter section of the resulting top sheet was laid on the flat top surface of a cube-corner sheet as described in Example 1, and the reflectance of the composite measured at various horizon angles using light having a vertical incidence angle of 86° and an observation angle of 0.2°. Results are shown in FIG. 11 in candella per lux per square meter.

What is claimed is:

1. Low profile raised retroreflective sheeting which may be wound into a storage roll and rapidly unwound and applied to a substrate where it is capable of brightly retroreflecting high-incidence-angle light, said sheeting comprising a base sheet extending in the plane of the sheeting and configured on its bottom face with cube-corner retroreflective elements adapted to reflect light that impinges on the opposite face of the sheet within a predetermined angular range; and a light-directing sheet joined to said opposite face and configured on its top surface with a longitudinally-extending series of projections less than about 3 millimeters in height, said projections having a trapezoidal cross-section with the legs of the trapezoid being the front and back edge surfaces of the projection, the front edge surface being disposed across the path of said high-incident-angle-light so as to transmit a high percentage of any of such light that impinges on the surface; and the back edge surface of the projection being disposed to both reflect light transmitted by the front edge surface to a path within said predetermined angular range for retroreflection by the retroreflective elements, and to return light reflected by the retroreflective elements back through the front edge surface toward its source.

2. Sheeting of claim 1 in which the angles between the front and back edge surfaces and the plane of the sheeting are equal.

3. Sheeting of claim 2 in which said angles are between 45 and 60°.

4. Sheeting of claim 2 in which said angles are about 53°.

5. Sheeting of claim 1 in which said projections have a height of less than about one millimeter.

6. Sheeting of claim 1 in which the projections are present at a density providing a ratio of longitudinal spacing between projections to height of projections of no more than about 5 to 1.

7. Sheeting of claim 1 that further includes a cover sheet spaced from said cube-corner retroreflective elements over most of its area but bonded to the cube-corner surface by a network of bonds.

8. Sheeting of claim 7 in which said cover sheet carries a layer of microspheres for retroreflecting light that passes through said cube-corner retroreflective elements.

9. Sheeting of claim 7 in which said bonds comprise binder material thermoformed at the point of contact between the cover sheet and the cube-corner surface and cured in situ after being thermoformed.

10. Sheeting of claim 9 in which the curing of said bonds is induced with an electron beam.

11. Low-profile raised retroreflective sheeting useful for application onto a substrate to retroreflect light that strikes the substrate at a high incidence angle, comprising, in combination as superposed layers, a base layer of retroreflective elements arranged to retroreflect light that impinges on top of the layer, and a light-directing layer attached above said base layer; the light-directing layer comprising a plurality of short transparent projections arranged in series along a longitudinal axis of the sheeting, with the front edge surfaces of the projections being disposed upwardly and across the longitudinal axis so as to transmit a high percentage of high-incidence-angle light that impinges on the surface, and the back edge surfaces of the projections being disposed to direct said transmitted light downwardly for retroreflection by said base layer; said light being retroreflected by the base layer upwardly to the back edge surface, then directed to the front edge surface, and then returned toward the light-source along substantially the same path as the light originally traveled to the sheeting.

12. Sheeting of claim 11 in which said projections have a height of less than 3 millimeters.

13. Sheeting of claim 11 in which said base retroreflective layer comprises a sheet configured on its bottom surface with cube-corner retroreflective elements.

14. Sheeting of claim 13 that further includes a cover sheet spaced from said cube-corner retroreflective elements over most of its area but bonded to the cube-corner surface by a network of bonds.

15. Sheeting of claim 14 in which said cover sheet carries a layer of microspheres for retroreflecting light that passes through said cube-corner retroreflective elements.

16. Sheeting of claim 14 in which said bonds comprise binder material thermoformed at the point of contact between the cover sheet and the cube-corner surface and cured in situ after being thermoformed.

17. Sheeting of claim 16 in which the curing of said bonds is induced with an electron beam.

18. Sheeting of claim 13 in which said cube-corner retroreflective elements are covered with specularly reflecting means.

19. Sheeting of claim 11 in which the projections have a trapezoidal cross-section with the front and back edge surfaces forming the legs of the trapezoid.

20. Sheeting of claim 19 in which the angles between the front and back edge surfaces and the plane of the sheeting are equal.

21. Sheeting of claim 20 in which said angles are between 45° and 60°.

22. Sheeting of claim 11 in which said back edge surface is covered with a specularly reflecting material.

23. Sheeting of claim 11 in which said projections comprise projections that are diamond-shaped in plan view.

24. Sheeting of claim 11 in which said projections comprise projections that are rectangular in plan view and have a length along the longitudinal axis of the sheeting at least 50 percent of their transverse length.

25. Sheeting of claim 11 in which said projections have a height less than 5 millimeters.

26. Sheeting of claim 11 in which said projections are present at a density providing a ratio of longitudinal spacing between projections to height of projections of no more than about 50 to 1.

27. Sheeting of claim 11 in which said projections are present at a density providing a ratio of longitudinal spacing between projections to height of projections of no more than about 5 to 1.

* * * * *